United States Patent
Endo et al.

(10) Patent No.: US 8,098,039 B2
(45) Date of Patent: Jan. 17, 2012

(54) GENERATOR MOTOR DRIVING DEVICE AND METHOD FOR DISCHARGING CHARGES FROM CAPACITOR OF GENERATOR MOTOR DRIVING DEVICE

(75) Inventors: Takayoshi Endo, Hiratsuka (JP); Tomohisa Sato, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 314 days.

(21) Appl. No.: 12/450,063

(22) PCT Filed: Mar. 13, 2008

(86) PCT No.: PCT/JP2008/054644
§ 371 (c)(1),
(2), (4) Date: Sep. 10, 2009

(87) PCT Pub. No.: WO2008/111649
PCT Pub. Date: Sep. 18, 2008

(65) Prior Publication Data
US 2010/0090628 A1   Apr. 15, 2010

(30) Foreign Application Priority Data
Mar. 13, 2007   (JP) .................................. 2007-063915

(51) Int. Cl.
*H02P 1/46* (2006.01)
*H02P 3/18* (2006.01)
*H02P 6/00* (2006.01)

(52) U.S. Cl. ..................... 318/701; 318/400.3; 318/139; 318/376; 180/65.21; 180/65.29

(58) Field of Classification Search .................. 318/701, 318/400.3, 139, 376; 180/65.21, 65.29
See application file for complete search history.

(56) References Cited

U.S. PATENT DOCUMENTS

| 5,325,042 A | * | 6/1994 | Murugan | ........................ 322/10 |
| 2010/0141213 A1 | * | 6/2010 | Iida | ................................ 320/134 |
| 2010/0219794 A1 | * | 9/2010 | Sugimoto et al. | ............. 320/128 |

FOREIGN PATENT DOCUMENTS

| JP | 2004-357412 | 12/2004 |
| JP | 2005-218285 | 8/2005 |
| JP | 2007-195352 | 8/2007 |

OTHER PUBLICATIONS

International Search Report and Written Opinion issued in PCT/JP2008/054644 dated Jun. 3, 2008.

* cited by examiner

*Primary Examiner* — Walter Benson
*Assistant Examiner* — Erick Glass
(74) *Attorney, Agent, or Firm* — Edwards Wildman Palmer LLP (57) ABSTRACT

The present invention provides a generator motor driving device that can promptly perform discharging of charges from the capacitor during a maintenance operation, and a capacitor discharge method to be implemented in the generator motor driving device. Power is supplied from the capacitor to the generator motor being driven by the engine, and the generator motor is driven, with the engine as a load. Rated constant current control is performed on the generator motor, and rated constant voltage control is performed on the booster, until the capacitor voltage decreases to a first voltage. After the capacitor voltage decreases to the first voltage, the rated constant current control is performed on the generator motor, and voltage control is performed on the booster to maintain a predetermined ratio between the capacitor voltage and the booster output voltage to be output to the driver, until the capacitor voltage decreases to a second voltage that is lower than the first voltage.

8 Claims, 11 Drawing Sheets

GENERATOR MOTOR DRIVING DEVICE AND METHOD FOR DISCHARGING CHARGES FROM CAPACITOR OF GENERATOR MOTOR DRIVING DEVICE

TECHNICAL FIELD

The present invention relates to a generator motor driving device that includes a generator motor and a capacitor as a main power storage device, and a method for discharging charges from the capacitor of the generator motor driving device.

BACKGROUND ART

In hybrid vehicles each having an engine as a drive source and a generator motor mounted therein, a large-capacity capacitor such as an electric double layer capacitor is often used as the main power storage device. Such a capacitor characteristically has a large capacity and a long life, but also easily deteriorates if a full charge state or a nearly-full charge state continues. To prevent deterioration of the capacitor, there has been a known technique for moving part of the charges stored in the capacitor to an auxiliary power storage device with the use of a charge control unit at the end of an operation or the like (see, for example, Patent Document 1).

Patent Document 1: Japanese Patent Application Laid-Open No. 2005-218285

DISCLOSURE OF THE INVENTION

Problem to be Solved by the Invention

When a maintenance operation is performed on the capacitor and the peripheral devices of the capacitor, charges are discharged from the capacitor so as to secure safety. The above conventional technique may be utilized when the discharging of charges from the capacitor is performed at the time of maintenance.

According to the above conventional technique, however, not all the charges stored in the capacitor are to be discharged. Therefore, to form a structure that can promptly perform the discharging of charges from the capacitor by the conventional technique, the charge control unit needs to be a large-scale structure, which is not realistic.

The present invention has been made in view of the above circumstances, and an object thereof is to provide a generator motor driving device that can promptly perform discharging of charges from the capacitor during a maintenance operation, and a capacitor discharge method to be implemented in the generator motor driving device.

Means for Solving Problem

According to an aspect of the present invention, a generator motor driving device includes: a generator motor; an engine that has a drive shaft linked to the generator motor; a capacitor that stores electric power generated from the generator motor, and supplies power to the generator power; a driver that is connected to the generator motor and drives the generator motor, and is supplied with the electric power generated from the generator motor; a booster that is connected in parallel to the capacitor and the driver, and boosts a capacitor voltage of the capacitor and outputs the boosted voltage to the driver; and a controller that supplies power from the capacitor to the generator motor being driven by the engine, drives the generator motor using the engine as a load, performs a rated constant current control on the generator motor and a rated constant voltage control on the booster until the capacitor voltage decreases to a first voltage, and, after the capacitor voltage decreases to the first voltage, performs the rated constant current control on the generator motor and a voltage control on the booster to maintain a predetermined ratio between the capacitor voltage and a booster output voltage to be output to the driver until the capacitor voltage decreases to a second voltage that is lower than the first voltage.

Advantageously, in the generator motor driving device, the second voltage is the capacitor voltage observed when the booster output voltage is equal to counter electromotive force of the generator motor or is a predetermined voltage in the neighborhood of the counter electromotive force, and when the capacitor voltage decreases to the second voltage, the controller performs control to reduce a current flowing in the generator motor, and performs control to fix the booster output voltage to the counter electromotive force or to a predetermined voltage in the neighborhood of the counter electromotive force.

Advantageously, in the generator motor driving device, when the capacitor voltage decreases to a third voltage that is lower than the second voltage, the controller continues to perform the control performed at the time of the decrease to the third voltage for a predetermined period of time.

Advantageously, in the generator motor driving device, when the capacitor voltage decreases to a third voltage that is lower than the second voltage, the controller stops performing the control, and when the capacitor voltage is lower than the second voltage and is higher than a fourth voltage being higher than the third voltage after a predetermined stand-by period of time has passed since the stop of the control, the controller performs control to reduce the current flowing in the generator motor, and performs control to fix the booster output voltage to the counter electromotive force or to a predetermined voltage in the neighborhood of the counter electromotive force.

Advantageously, in the generator motor driving device, the generator motor is a SR motor, and when the capacitor voltage decreases to the second voltage, the controller continues to perform the control performed at a time of the decrease to the second voltage for a predetermined period of time.

Advantageously, in the generator motor driving device, the booster is an AC-coupled bidirectional DC-DC converter which includes two voltage source inverters having direct-current terminals connected in series to be additive polarity and a transformer AC-coupling alternating-current terminals of the two voltage source inverters to each other and having a predetermined leakage inductance, in which one of the two voltage source inverters is connected in parallel to the capacitor, and which outputs a direct-current voltage obtained by boosting the capacitor voltage of the capacitor to the one of the two voltage source inverters.

Advantageously, in the generator motor driving device, after the capacitor voltage decreases to the first voltage, the controller performs voltage control on the booster to make the booster output voltage twice as high as the capacitor voltage until the capacitor voltage decreases to the second voltage.

According to another aspect of the present invention, a method for discharging charges of a capacitor in a generator motor driving device that includes a generator motor, an engine that has a drive shaft linked to the generator motor, a capacitor that stores electric power generated from the generator motor and supplies power to the generator power, a driver that is connected to the generator motor and drives the generator motor and is supplied with the electric power generated from the generator motor, and a booster that is connected in parallel to the driver and boosts a capacitor voltage of the capacitor and outputs the boosted voltage to the driver, includes: supplying power from the capacitor to the generator motor being driven by the engine, and driving the generator motor using the engine as a load; performing a rated constant current control on the generator motor and a rated constant voltage control on the booster until the capacitor voltage decreases to a first voltage; performing the rated constant current control on the generator motor and the rated constant voltage control on the booster until the capacitor voltage decreases to a first voltage; and after the capacitor voltage decreases to the first voltage, performing the rated constant current control on the generator motor and a voltage control on the booster to maintain a predetermined ratio between the capacitor voltage and a booster output voltage to be output to the driver, until the capacitor voltage decreases to a second voltage that is lower than the first voltage.

Effect of the Invention

In accordance with the present invention, a power source is supplied from the capacitor to the generator motor being driven by the engine. The engine is driven as a load. Rated constant current control is performed on the generator motor, and rated constant voltage control is performed on the booster, until the capacitor voltage decreases to the first voltage. After the capacitor voltage decreases to the first voltage, rated constant current control is performed on the generator motor, and voltage control is performed on the booster to maintain a predetermined ratio between the booster output voltage to be output to the driver and the capacitor voltage, until the capacitor voltage decreases to the second voltage that is lower than the first voltage. Accordingly, a component for discharging charges from the capacitor is not required, and the discharging of charges from the capacitor can be promptly performed at the time of maintenance.

EXPLANATIONS OF LETTERS OR NUMERALS 1, 11 generator motor driving device
2, 12 generator motor
3 engine
4 capacitor
5, 13 driver
6, 14 booster
7 driver capacitor
8 contactor
9, 15 controller
16 excitation power supply
17 diode
18 relay
21 AC-coupled bidirectional DC-DC converter
22 lower inverter
23 upper inverter
24 transformer
24*a*, 24*b* coil
25, 26 capacitor
221*a*, 221*b*, 221*c*, 221*d*, 231*a*, 231*b*, 231*c*, 231*d* IGBT
222*a*, 222*b*, 222*c*, 222*d*, 232*a*, 232*b*, 232*c*, 232*d* diode

BEST MODE(S) FOR CARRYING OUT THE INVENTION

The following is a description of the best modes to embody the present invention (hereinafter referred to as the embodiments), with reference to the accompanying drawings.

First Embodiment

Figure 1:
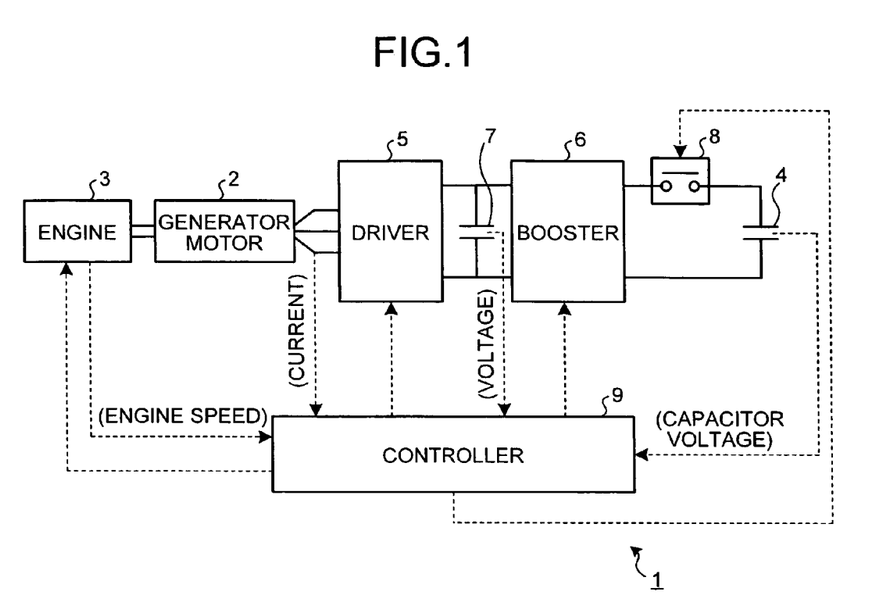
FIG. 1 illustrates the structure of a generator motor driving device in accordance with a first embodiment of the present invention.

FIG. 1 illustrates the structure of a generator motor driving device in accordance with a first embodiment of the present invention. The generator motor driving device 1 shown in FIG. 1 includes: a generator motor 2; an engine 3 that has a drive shaft linked to the drive shaft of the generator motor 2; a large-capacity capacitor 4 that stores electric power generated from the generator motor 2 and supplies power to the generator motor 2; a driver 5 that is connected to the generator motor 2 and drives the generator motor 2; a booster 6 that is connected in parallel to the capacitor 4, boosts the voltage of the capacitor 4, and outputs the boosted voltage to the driver 5; a driver capacitor 7 that is connected in parallel to the driver 5 and the booster 6 and performs waveform shaping and surge absorbing; a contactor 8 that is connected in series between the capacitor 4 and the booster 6; and a controller 9 that forms at least a part of the control unit that controls operations of the generator motor driving device 1.

The generator motor 2 is formed with a PM (Permanent Magnetic) motor, for example. The capacitor 4 that supplies and receives electric power to and from the generator motor 2 is an electric double layer capacitor.

The controller 9 generates and outputs an engine speed command for the engine 3, a torque command for the generator motor 2, a voltage command for the booster 6, an on/off command for the contactor 8, and the likes, based on a current flowing between the generator motor 2 and the driver 5, the voltage of the driver capacitor 7, the engine speed of the engine 3, the capacitor voltage of the capacitor 4, and the likes. The torque command for the generator motor 2 is output to the driver 5.

Figure 2:
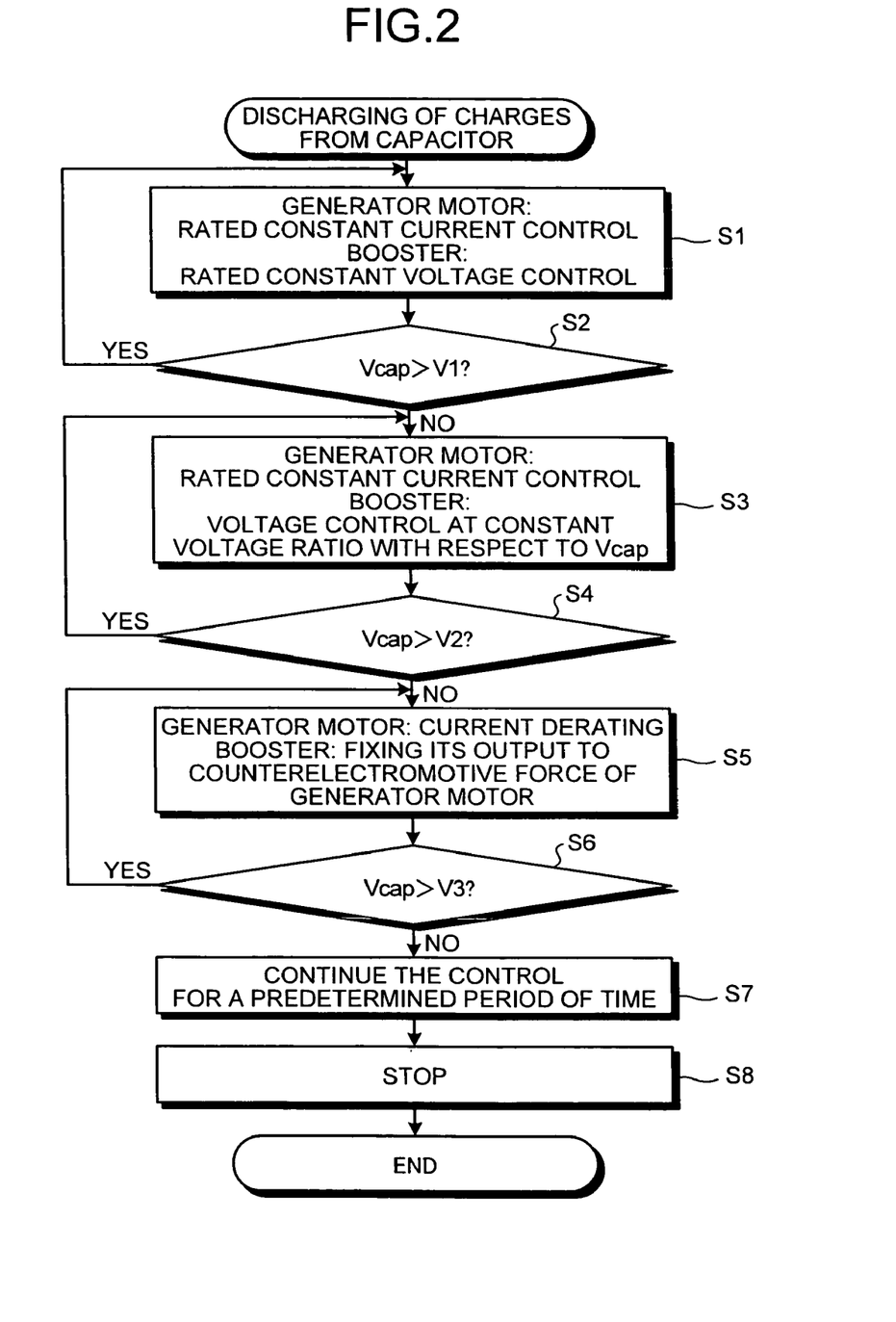
FIG. 2 is a flowchart showing the procedures according to a capacitor discharge method implemented in the generator motor driving device of the first embodiment.
Figure 3:
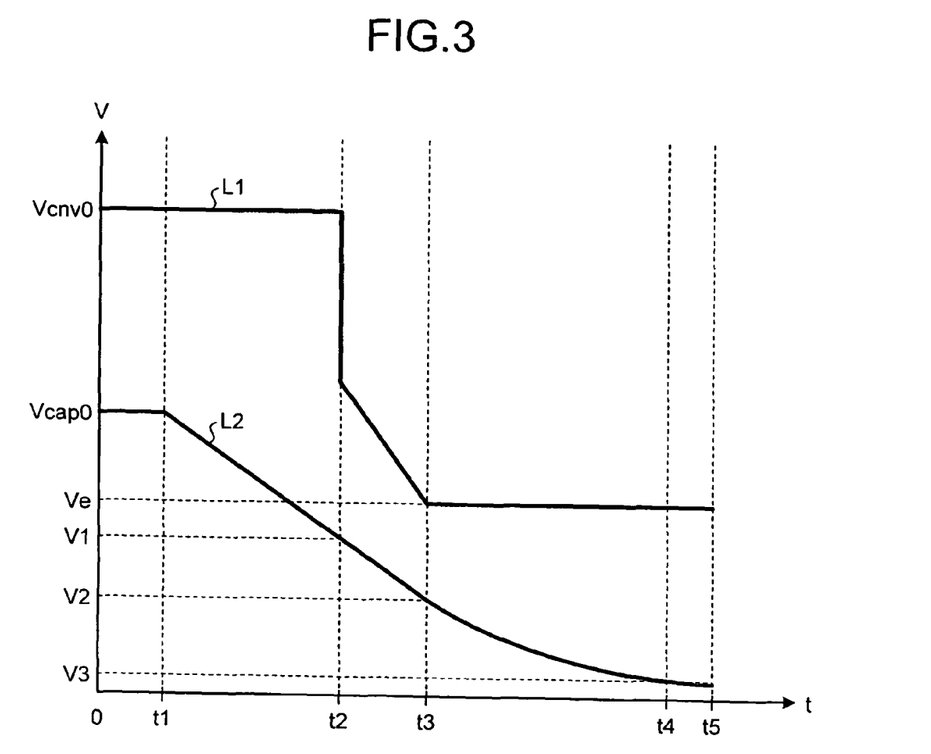
FIG. 3 shows the changes of the booster output voltage and the capacitor voltage with time according to the capacitor discharge method in the generator motor driving device of the first embodiment.

FIG. 2 is a flowchart showing the procedures according to a method for discharging charges from the capacitor (hereinafter referred to simply as the "capacitor discharge method") implemented in the generator motor driving device of the first embodiment. FIG. 3 shows the changes of the output voltage Vcnv of the booster 6 with time (curve L1) and the changes of the capacitor voltage Vcap of the capacitor 4 with time (curve L2) according to the capacitor discharge method of the first embodiment. Referring to these drawings, the capacitor discharge method of the first embodiment is now described.

In the example case described below, power is supplied, via the driver 5, from the capacitor 4 to the generator motor 2 being driven by the engine 3, and the device is operated in a power running mode in which the generator motor 2 is driven, with the engine 3 as a load. Switching between the power running mode and a regenerating mode (a mode for supplying charge to the capacitor 4 through power generation) in the generator motor 2 is performed by adjusting the phase of a switching circuit in the driver 5 under the control of the controller 9.

First, the controller 9 performs rated constant current control on the generator motor 2, and also performs rated constant voltage control on the booster 6 (step S1). While the capacitor voltage Vcap is higher than a first voltage V1 (Yes in step S2), the controller 9 continues the control procedure of step S1. It is preferable that the value of the first voltage V1 is set as the minimum value in the voltage fluctuation range observed during a regular operation of the capacitor 4.

As the controller 9 continues the control procedure of step S1, the capacitor voltage Vcap starts decreasing from an initial value Vcap0 (time t1 in FIG. 3). On the other hand, the booster output voltage Vcnv remains at an initial value Vcnv0, while the rated constant voltage control is performed.

When the capacitor voltage Vcap decreases to the first voltage V1 (No in step S2), the controller 9 changes its control operations. More specifically, while performing the rated constant current control on the generator motor 2, the controller 9 performs voltage control on the booster 6, so that the booster output voltage Vcnv maintains a predetermined ratio with respect to the capacitor voltage Vcap (step S3). In FIG. 3, the capacitor voltage reaches the first voltage V1 at time t2. After time t2, the booster output voltage Vcnv gradually decreases, while maintaining the constant ratio with respect to the capacitor voltage Vcap (Vcnv/Vcap). This ratio is set so that the inductor in the booster 6 is not saturated and the loss of the booster 6 becomes smallest.

Since a PM motor is used as the generator motor 2 in the first embodiment, the value of the booster output voltage Vcnv should not become lower than the value of the counter electromotive force Ve generated in the PM motor. Therefore, while the capacitor voltage Vcap is higher than a second voltage V2 equivalent to the counter electromotive force Ve of the PM motor (Yes in step S4), the controller 9 continues the control procedure of step S3. In the example case illustrated in FIG. 3, the capacitor voltage Vcap reaches the second voltage V2 at time t3. The value of the second voltage V2 may not be a value equivalent to the counter electromotive force Ve of the PM motor, and may be a value equivalent to a predetermined voltage Ve' slightly higher than the counter electromotive force Ve of the PM motor.

When the capacitor voltage Vcap decreases to the second voltage V2 (No in step S4), the controller 9 performs control on the generator motor 2 to reduce the current flowing in the generator motor 2 (current derating), and also performs control on the booster 6 to fix the booster output voltage Vcnv to the counter electromotive force Ve of the generator motor 2 (or Ve') (step S5). Through this control procedure, the generator motor output voltage Vcnv becomes the constant value Ve (or Ve'), and the capacitor voltage Vcap gradually becomes lower. The controller 9 continues the control procedure of step S5 until the capacitor voltage Vcap reaches a third voltage V3 that is lower than the second voltage V2 (Yes in step S6). In the example case shown in FIG. 3, the capacitor voltage Vcap reaches the third voltage V3 at time t4. It is preferable that the third voltage V3 has such a value that the value of the charge of the capacitor 4 becomes substantially zero and the electric discharge can be considered completed. However, the third voltage V3 may have a value that can be considered to be safe as the voltage for maintenance operations, or a value that is lower than the statutory hazardous voltage.

When the capacitor voltage Vcap decreases to the third voltage V3 (No in step S6), the controller 9 continues to carry out the control procedure of step S5 for a predetermined period of time (step S7), and stops performing the control (step S8). The controller 9 continues to perform the control for the predetermined period of time (the time between t5 and t4 in FIG. 3) in step S7, because the charges of the capacitor 4 rapidly increases if the controller 9 stops performing the control immediately after the charge amount in the capacitor 4 becomes substantially zero. In view of this, the period of time during which the control is continued in step S7 should be set in such a manner that the charge amount in the capacitor 4 does not rapidly increase after the controller 9 stops performing the control.

In accordance with the first embodiment of the present invention described above, a power source is supplied from the capacitor to the generator motor being driven by the engine. The engine is driven as a load. Rated constant current control is performed on the generator motor, and rated constant voltage control is performed on the booster, until the capacitor voltage decreases to the first voltage. After the capacitor voltage decreases to the first voltage, rated constant current control is performed on the generator motor, and voltage control is performed on the booster to maintain a predetermined ratio between the booster output voltage to be output to the driver and the capacitor voltage, until the capacitor voltage decreases to the second voltage that is lower than the first voltage. Accordingly, a component for discharging charges from the capacitor is not required, and the discharging of charges from the capacitor can be promptly performed at the time of maintenance.

In accordance with the first embodiment, the control is continued for a predetermined period of time, even after the capacitor voltage decreases to such a value that the discharging can be considered completed. Thus, a rapid increase in the charge amount of the capacitor after the end of the control can be prevented.

In accordance with the first embodiment, control operations are varied, depending on the decrease of the capacitor voltage. Accordingly, it is possible to prevent the voltage from becoming higher than the withstand voltage due to the surge voltage in a power device in the booster caused by an increase of the heating value along with a decrease of the capacitor voltage. It is also possible to prevent overcurrent breakdown due to current saturation in the inductor. Thus, the durability of the generator motor driving device can be increased.

Modification of First Embodiment

Figure 4:
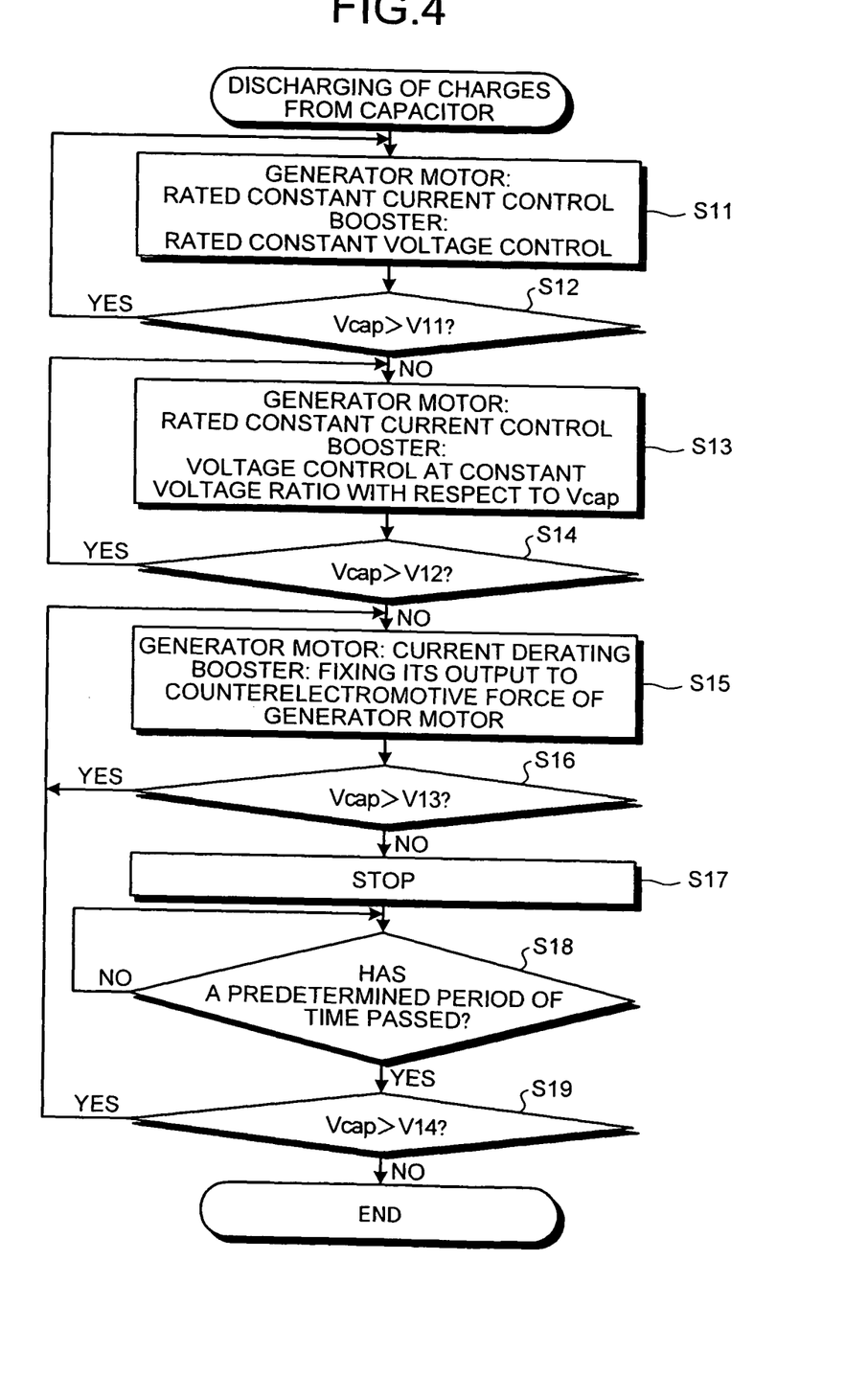
FIG. 4 is a flowchart showing the procedures according to a capacitor discharge method implemented in a generator motor driving device of a modification of the first embodiment.

FIG. 4 is a flowchart showing procedures according to a capacitor discharge method in a modification of the first embodiment. In FIG. 4, the procedures of steps S11 through S16 are the same as the procedures of steps S1 through S6 of the capacitor discharge method in the first embodiment. In this modification, however, first and second voltages are represented by V11 and V12, respectively. In the following, the procedures of step S16 and later steps are described.

When the capacitor voltage Vcap reaches a third voltage V13 (No in step S16), the controller 9 stops performing the control (step S17).

After that, the controller 9 stands by until a predetermined stand-by period of time passes (No in step S18). After the stand-by period of time has passed since the stop of the control (Yes in step S18), the controller 9 again performs the current derating on the generator motor 2 and again performs the control on the booster 6 to fix the output to the counter electromotive force Ve of the generator motor 2 (step S15), if the capacitor voltage Vcap is higher than a fourth voltage V14 that is lower than the second voltage V12 but is higher than the third voltage V13 (Yes in step S19). The controller 9 then repeats the procedures of step S16 and later steps.

After the stand-by period of time has passed since the stop of the control by the controller 9 (Yes in step S18), the controller 9 ends the discharging of charges from the capacitor, if the capacitor voltage Vcap is equal to or lower than the fourth voltage V14 (No in step S19). In this sense, the value of the fourth voltage V14 is the value at which the discharging of charges from the capacitor 4 can be considered completed.

Figure 5:
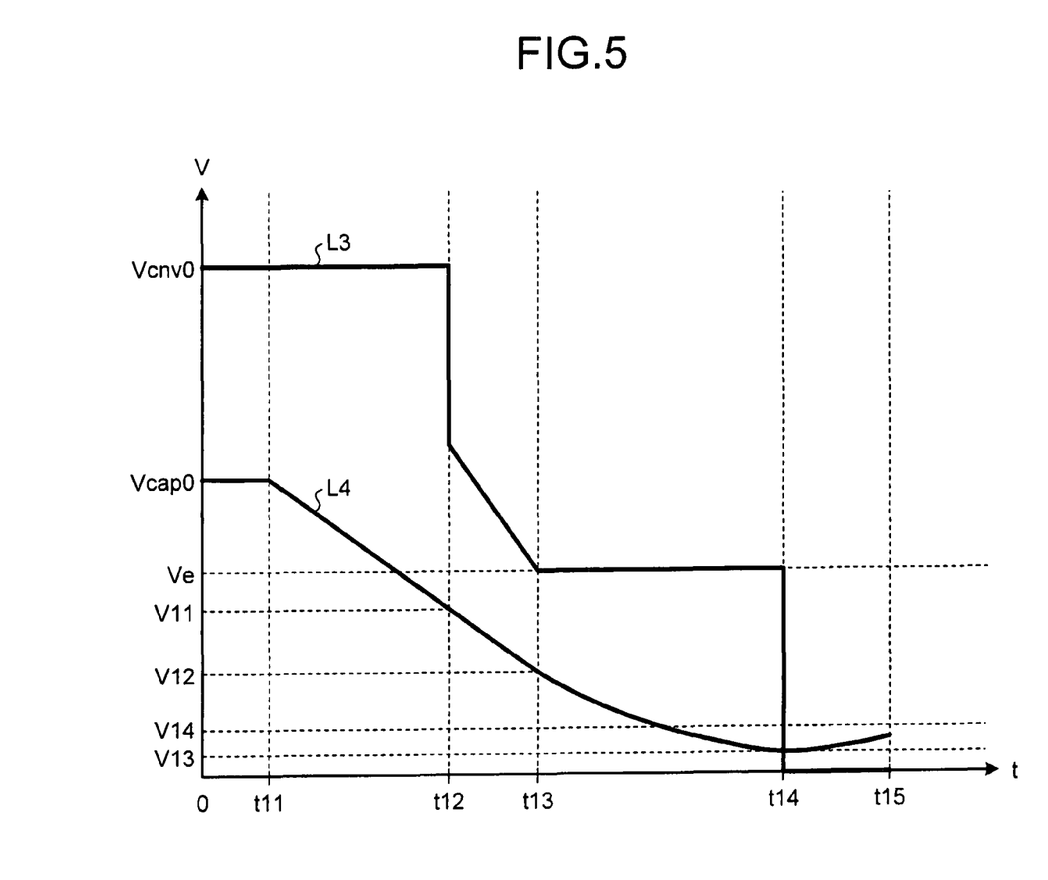
FIG. 5 shows an example (a first example) of the changes of the booster output voltage and the capacitor voltage with time according to the capacitor discharge method in the generator motor driving device of the modification of the first embodiment.

FIG. 5 shows an example (a first example) of the changes of the output voltage Vcnv of the booster 6 with time (curve L3) and the changes of the capacitor voltage Vcap of the capacitor 4 with time (curve L4) according to the capacitor discharge method of this modification. To clearly show the difference between the example case shown in FIG. 3 and the example case shown in FIG. 5, the changes caused in the curves L3 and L4 before time t14 shown in FIG. 5 are the same as the changes caused in the curves L1 and L2 until time t4 shown in FIG. 3, and times t11 through t14 correspond to times t1 through t4 of FIG. 3, respectively.

In the curve L3 in FIG. 5, the capacitor voltage Vcap increases after time t14, but becomes lower than the fourth voltage V14 at time t15 when the predetermined stand-by period of time has passed since time t14 (corresponding to the case of "No" in step S19). Accordingly, the generator motor driving device 1 ends the discharging of charges from the capacitor at time t15.

Figure 6:
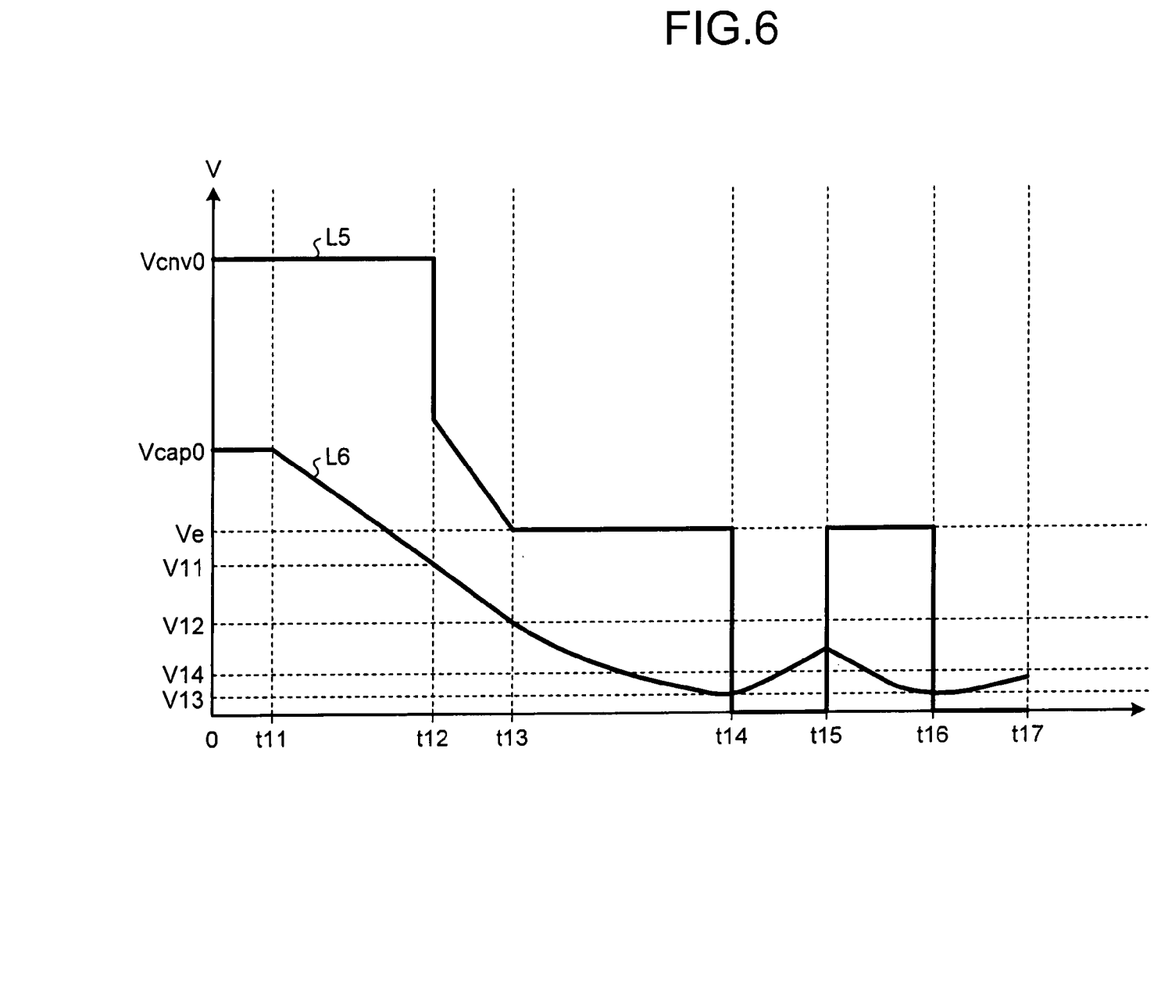
FIG. 6 shows another example (a second example) of the changes of the booster output voltage and the capacitor voltage with time according to the capacitor discharge method in the generator motor driving device of the modification of the first embodiment.

FIG. 6 shows another example (a second example) of the changes of the output voltage Vcnv of the booster 6 with time (curve L5) and the changes of the capacitor voltage Vcap of the capacitor 4 with time (curve L6) according to the capacitor discharge method of this modification. In FIG. 6, the changes caused in the curves L5 and L6 before time t14 are also the same as the changes caused in the curves L1 and L2 until time t4 shown in FIG. 3, and times t11 through t14 correspond to times t1 through t4 of FIG. 3, respectively.

In the curve L6 in FIG. 6, the capacitor voltage Vcap increases after time t14, and becomes higher than the fourth voltage V14 at time t15 when the predetermined stand-by period of time has passed since time t14 (corresponding to the case of "Yes" in step S19). Accordingly, the generator motor driving device 1 returns to step S15 and repeats the procedures. After time t15, the output voltage Vcnv of the booster 6 has the constant value Ve, but the capacitor voltage Vcap gradually becomes lower. When the capacitor voltage Vcap becomes as low as the third voltage V13 (time t16), the controller 9 stops performing the control. In the curve L6, the capacitor voltage Vcap at time t17 when the stand-by period of time has passed since time t16 (t17−t16=t15−t14) is lower than the fourth voltage V14 (corresponding to the case of "No" in step S19). Accordingly, the generator motor driving device 1 ends the discharging of charges from the capacitor at time t17. If the capacitor voltage Vcap at time t17 is still higher than the fourth voltage V14, the controller 9 again returns to step S15 and repeats the above procedures.

Like the first embodiment, the above described modification of the first embodiment can prevent a rapid increase of the charge amount in the capacitor after the end of a control operation.

Second Embodiment

Figure 7:
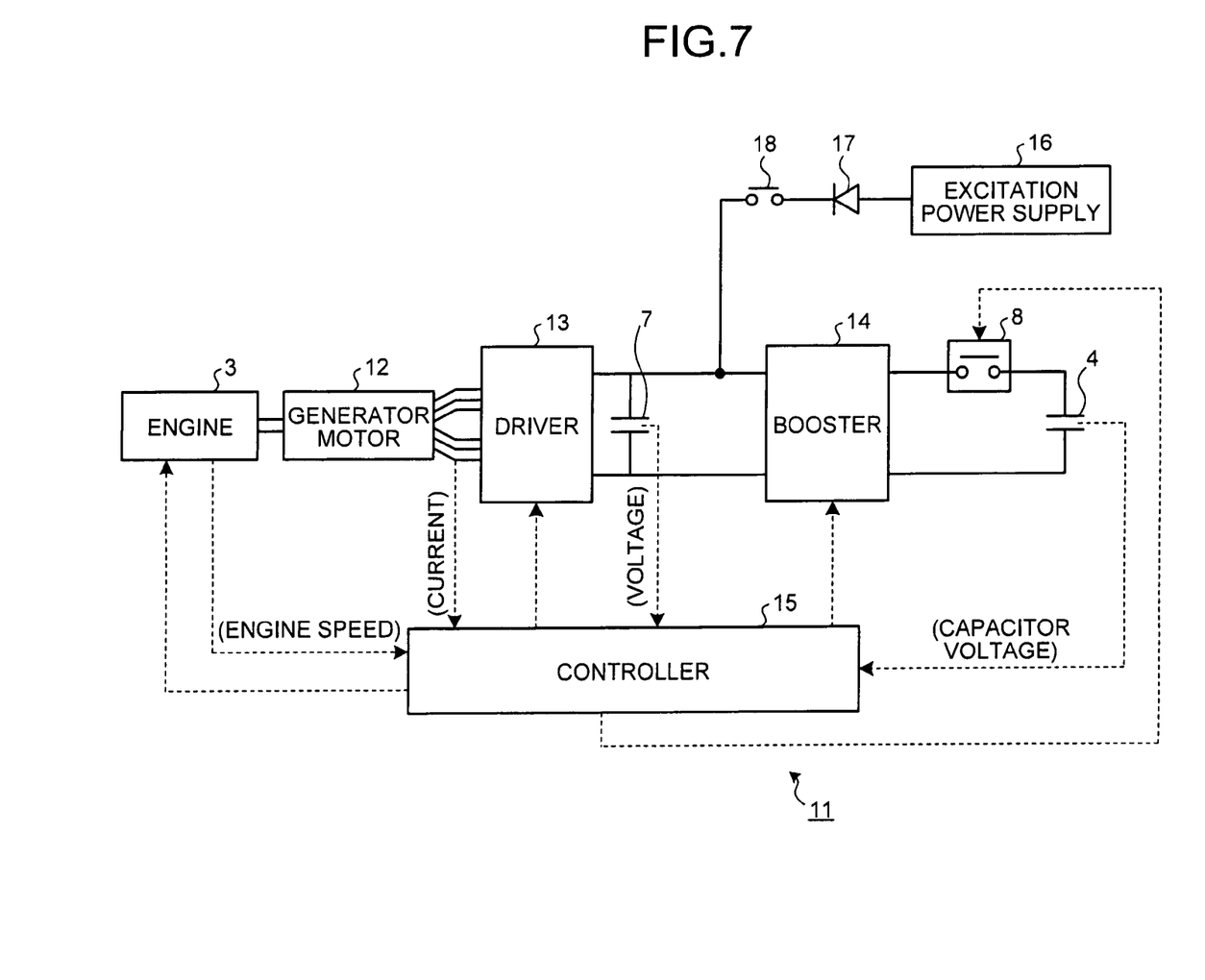
FIG. 7 illustrates the structure of a generator motor driving device in accordance with a second embodiment of the present invention.

FIG. 7 illustrates the structure of a generator motor driving device in accordance with a second embodiment of the present invention. The generator motor driving device 11 shown in FIG. 7 includes: a generator motor 12 formed with a SR (Switched Reluctance) motor; an engine 3 that has a drive shaft linked to the drive shaft of the generator motor 12; a capacitor 4; a driver 13 that is connected to the generator motor 12 and drives the generator motor 12; a booster 14 that is connected in parallel to the capacitor 4, boosts the voltage of the capacitor 4, and outputs the boosted voltage to the driver 13; a driver capacitor 7 for waveform shaping that is connected in parallel to the driver 13 and the booster 14; a contactor 8 that is connected in series between the capacitor 4 and the booster 14; a controller 15 that forms at least a part of the control unit that controls operations of the generator motor driving device 11; an excitation power supply 16 that is connected in series to the booster 14, and excites the generator motor 12; and a diode 17 and a relay 18 that are connected in series between the excitation power supply 16 and the driver 13.

Figure 8:
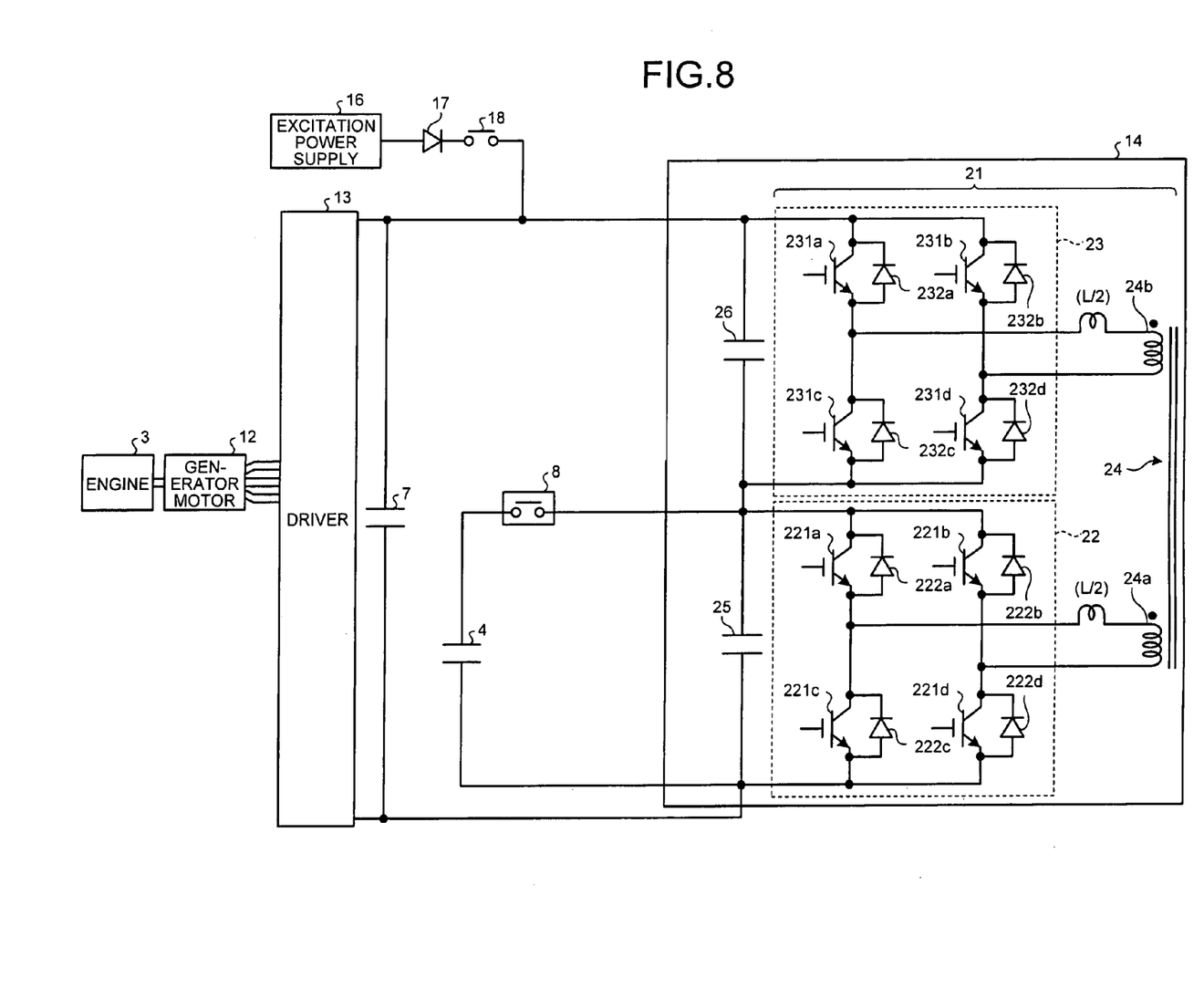
FIG. 8 illustrates the structure of the booster provided in the generator motor driving device of the second embodiment.

FIG. 8 shows the structure of the booster 14. The booster 14 is formed with an AC-coupled bidirectional DC-DC converter 21 of an additive polarity having two voltage source inverters AC-coupled to each other. The AC-coupled bidirectional DC-DC converter 21 includes a lower inverter 22 and an upper inverter 23 that are the two voltage source inverters, and a transformer 24 that AC-couples the lower inverter 22 and the upper inverter 23 to each other at the alternating current side.

The lower inverter 22 is formed with four IGBTs (Insulating Gate Bipolar Transistors) 221a, 221b, 221c, and 221d as switching devices for energization switching. Two of the IGBTs 221a, 221b, 221c, and 221d are bridge-connected to an upper arm, and the other two are bridge-connected to a lower arm. Diodes 222a, 222b, 222c, and 222d that have the reflux current generated at the time of energization switching are connected in parallel to the IGBTs 221a, 221b, 221c, and 221d, respectively. The upper inverter 23 includes four IGBTs 231a, 231b, 231c, and 231d as switching devices. Diodes 232a, 232b, 232c, and 232d are connected in parallel to the IGBTs 231a, 231b, 231c, and 231d, respectively.

In the lower inverter 22 and the upper inverter 23, the positive direct-current terminal of the lower inverter 22 and the negative direct-current terminal of the upper inverter 23 are connected in series to the additive polarity. The voltage applied from outside to the AC-coupled bidirectional DC-DC converter 21 is divided between the lower inverter 22 and the upper inverter 23.

A capacitor 25 mainly for surge absorption is connected in parallel to the lower inverter 22. The capacitance of the capacitor 25 is much smaller than the capacitance of the capacitor 4. Likewise, a small-capacity capacitor 26 for surge absorption is connected in parallel to the upper inverter 23. It is preferable that the capacitance of the capacitor 25 is larger than the capacitance of the capacitor 26. This is because the surge amount in the capacitor 25 on the side connected to the wire extending to the outside of the booster 14 is larger than the surge amount in the capacitor 26. As the capacitance of the capacitor 26 is restricted to a small value, the volume of the capacitor 26 does not need to be made unnecessarily large. Accordingly, the space required for the inverter can be made smaller.

While the lower inverter 22 is connected to a coil 24a of the transformer 24, the upper inverter 23 is connected to a coil 24b of the transformer 24. If the rated voltages of the direct voltages of the lower inverter 22 and the upper inverter 23 are almost equal to each other, it is preferable that the winding ratio between the coil 24a and the coil 24b is 1 to 1. Although the winding ratio between the coil 24a and the coil 24b is 1 to 1 in the second embodiment, the winding ratio may be changed if necessary.

The transformer 24 has a constant leakage inductance (denoted by L). In the booster 14, the leakage inductance is equally divided into L/2 on the side of the coil 24a and L/2 on the side of the coil 24b. The transformer 24 transmits the electric power temporarily stored in the leakage inductance to the capacitor 4 and the likes through high-speed switching control performed on the lower inverter 22 and the upper inverter 23. It is known that the leakage inductance in a transformer normally increases as the space between the primary coil and the secondary coil becomes wider. Therefore, it is often the case that a transfer is formed by bonding a primary coil tightly to a secondary coil. In the second embodiment, on the other hand, the space between the primary coil and the secondary coil or the space between the coil 24a and the coil 24b is adjusted, so as to create a desired leakage inductance. It is also possible to attach an inductance to the exterior of the transformer 24.

The capacitor 25 of the booster 14 having the above structure is connected in parallel to the capacitor 4, and the contactor 8 is connected in series between the capacitor 4 and the capacitor 25. As the contactor 8 is connected under the control of the controller 15, the booster 14 boosts the voltage of the capacitor 4 (the voltage on the primary side), and supplies the boosted voltage (the voltage on the secondary side) to the driver 13.

The booster 14 is connected to the excitation power supply 16 that excites the generator motor 12 on the secondary side. The reason that the excitation power supply 16 is provided in the generator motor driving device 11 is now described. A SR motor normally has such characteristics as to generate large regenerative energy when receiving a supply of electric energy, and does not function as a generator motor simply because the internal rotor is rotated. To operate a SR motor having such characteristics as a generator motor, the coil in the SR motor needs to be excited in advance. However, the charge amount in the driver capacitor 7 is zero when the engine 3 is started, and the generator motor 12 cannot be excited with the capacitor 4 by switching on the contactor 8 at the start of the engine 3. Therefore, the excitation power supply 16 is provided to excite the generator motor 12 at the start of the engine 3 in the second embodiment.

Figure 9:
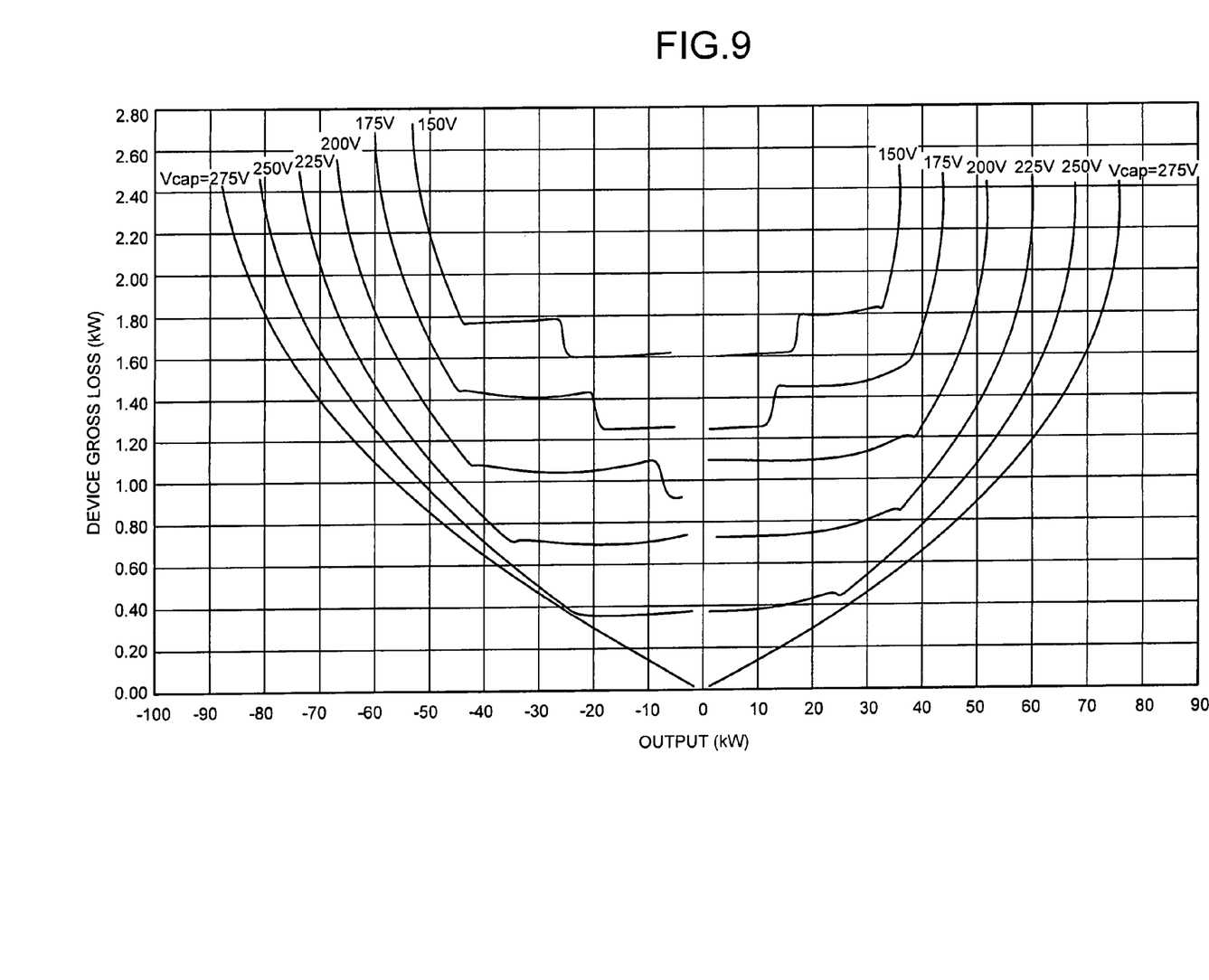
FIG. 9 shows the relationship between the output of the booster and the loss with respect to the capacitor voltage.

FIG. 9 shows the relationship between the output of the booster 14 and the device gross loss with respect to the capacitor voltage Vcap of the capacitor 4 in a case where the booster 14 is formed with the AC-coupled bidirectional DC-DC converter 21, and the rated power of the generator motor 12 is 550 (V). Here, the "device gross loss" includes the conduction loss of each IGBT and the resistance of the transformer 24 (inclusive of the direct-current resistance, the skin effect, and alternating-current resistance such as eddy-current loss), and is proportional to the amount of current flowing in the transformer 24. In FIG. 9, the results of comparisons made with the same output show that the device gross loss is smallest when the capacitor voltage Vcap is 275 (=550/2) (V). This is because, when the direct voltage V0 is equal to 2Vcap, the amount of current flowing in the transformer 24 is smaller than in a case where the direct voltage V0 is not equal to 2Vcap, and accordingly, the device gross loss becomes smaller (the amount of current flowing in the transformer 24 is ideally zero when electric power is not exchanged between the generator motor 12 and the capacitor 4). In the second embodiment, the coil ratio between the coil 24a and the coil 24b of the transformer 24 of the booster 14 is 1 to 1. Accordingly, the device gross loss becomes smallest when Vcnv is equal to 2Vcap. However, the voltage ratio at which the device gross loss becomes smallest varies with the coil ratio.

The reason that the excitation power supply 16 is provided in the generator power driving device 11 is now described. A SR motor normally has such characteristics as to generate large regenerative energy when receiving a supply of electric energy, and does not function as a generator motor simply because the internal rotor is rotated. To operate a SR motor having such characteristics as a generator motor, the coil in the SR motor needs to be excited in advance. However, the charge amount in the driver capacitor 7 is zero when the engine 3 is started, and the generator motor 12 cannot be excited with the capacitor 4 by switching on the contactor 8 at the start of the engine 3. Therefore, the excitation power supply 16 is provided to excite the generator motor 12 at the start of the engine 3 in the second embodiment. The excitation power supply 16 is shut off, when the voltage of the driver capacitor 7 becomes higher than the voltage of the excitation power supply 16.

Figure 10:
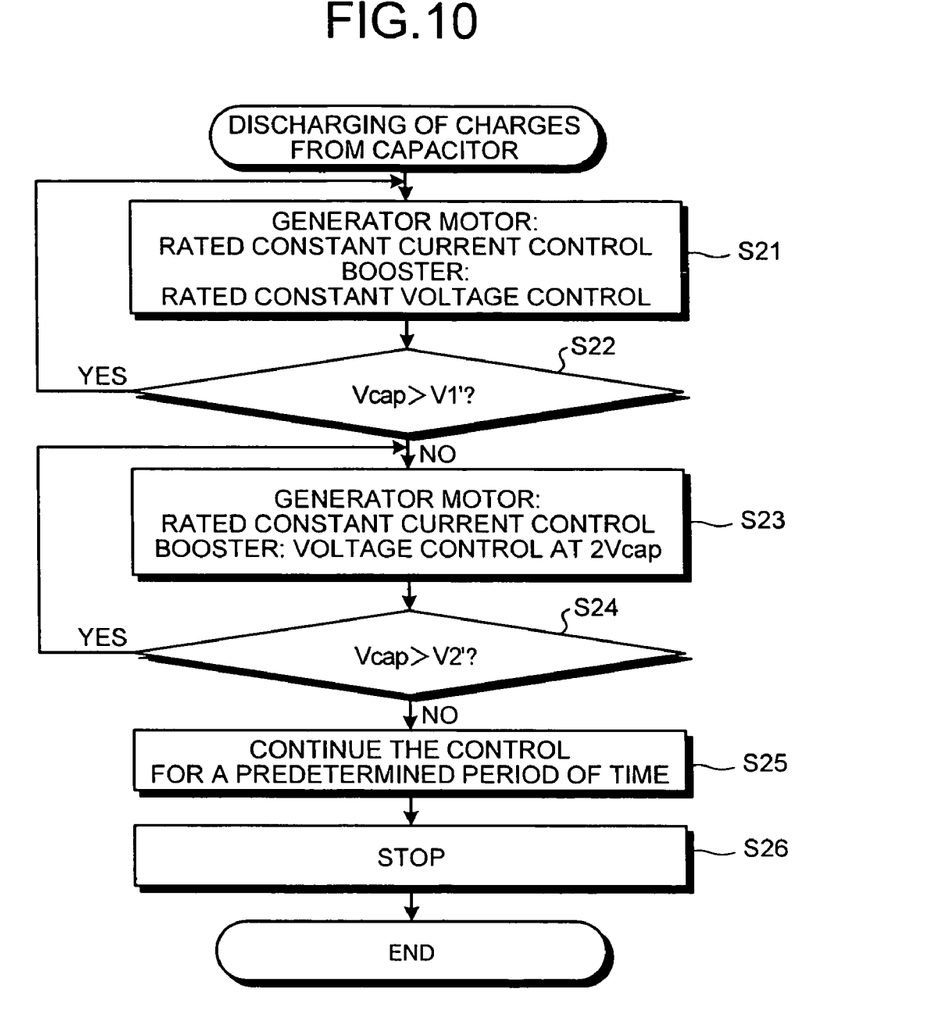
FIG. 10 is a flowchart showing the procedures according to a capacitor discharge method implemented in the generator motor driving device of the second embodiment.
Figure 11:
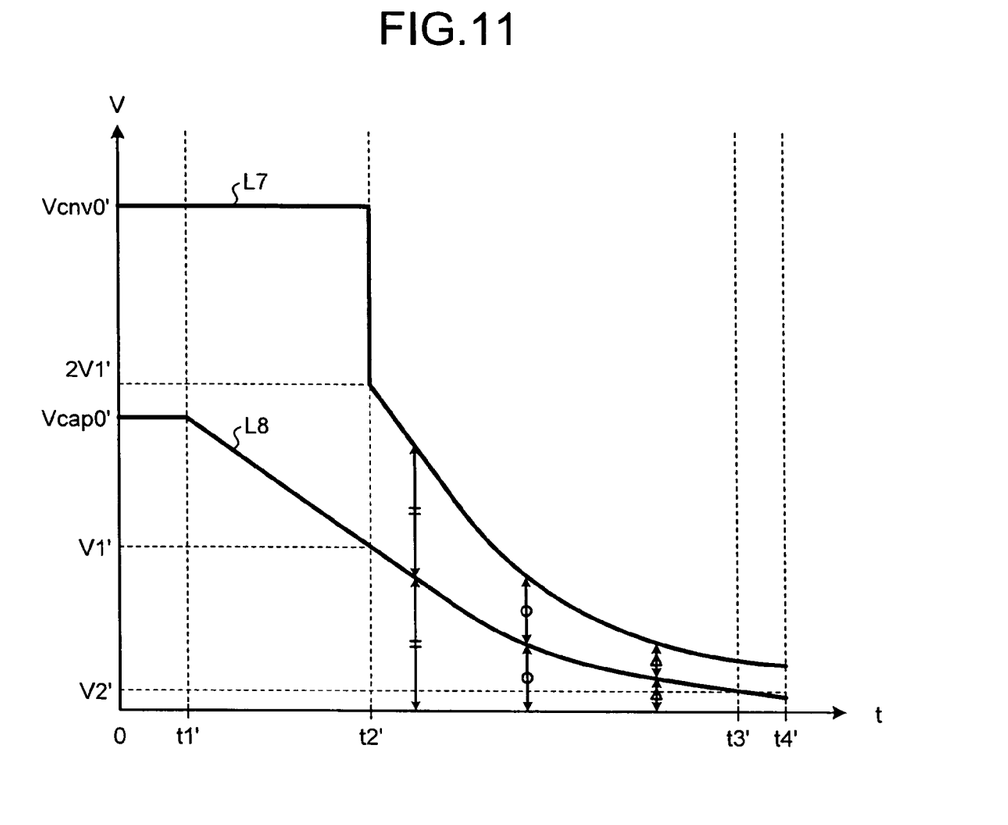
FIG. 11 shows the changes of the booster output voltage and the capacitor voltage with time according to the capacitor discharge method in the generator motor driving device of the second embodiment.

FIG. 10 is a flowchart showing the procedures according to a capacitor discharge method of the second embodiment. FIG. 11 shows the changes of the output voltage Vcnv of the booster 14 with time (curve L7) and the changes of the capacitor voltage Vcap with time (curve L8) according to the capacitor discharge method of the second embodiment. Referring to these drawings, the capacitor discharge method of the second embodiment is now described.

In the example case described below, power is supplied, via the driver 13, from the capacitor 4 to the generator motor 12 being driven by the engine 3, and the device is operated in a power running mode in which the engine 3 is driven as a load. Switching between the power running mode and the regenerating mode in the generator motor 12 is performed by adjusting the phase of a switching circuit in the driver 13 under the control of the controller 15.

First, the controller 15 performs rated constant current control on the generator motor 12, and also performs rated constant voltage control on the booster 14 (step S21). While the capacitor voltage Vcap is higher than a first voltage V1' (Yes in step S22), the controller 15 continues the control procedure of step S21. It is preferable that the value of the first voltage V1' is set as the minimum value in the voltage fluctuation range observed during a regular operation of the capacitor 4, like the first voltage V1 in the first embodiment.

As the controller 15 continues to carry out the control procedure of step S21, the capacitor voltage Vcap starts decreasing from an initial value Vcap0' (time t1' in FIG. 11). On the other hand, the booster output voltage Vcnv remains at an initial value Vcnv0', while the rated constant voltage control is performed.

When the capacitor voltage Vcap decreases to the first voltage V1' (No in step S22), the controller 15 changes its control operations. More specifically, while performing the rated constant current control on the generator motor 12, the controller 15 performs voltage control on the booster 14, so that the booster output voltage Vcnv becomes twice as high as the capacitor voltage Vcap (Vcnv=2Vcap) (step S23). In FIG. 11, the capacitor voltage reaches the first voltage V1' at time t2'. After time t2', the booster output voltage Vcnv gradually decreases, while maintaining the relationship, Vcnv=2Vcap.

In the second embodiment, a SR motor is used as the generator motor 12. Since a SR motor does not generate counter electromotive force, the controller 15 does not need to perform control so as to keep the value of the booster output voltage Vcnv above the value of the counter electromotive force of the generator motor.

While the capacitor voltage Vcap is higher than a second voltage V2' (Yes in step S24), the controller 15 continues to carry out the control procedure of step S23. In the example case illustrated in FIG. 11, the capacitor voltage Vcap reaches the second voltage V2' at time t3'. It is preferable that the value of the second voltage V2' is the value with which the charge amount in the capacitor 4 can be considered almost zero. However, the second voltage V2' may be a value that can be considered safe enough as the voltage used during a maintenance operation, or may be a lower value than the statutory hazardous voltage.

When the capacitor voltage Vcap decreases to the second voltage V2' (No in step S24), the controller 15 continues to carry out the control procedure of step S23 for a predetermined period of time (step S25). After that, the controller 15 stops performing the control (step S26). In this manner, a rapid increase of the charge amount in the capacitor 4 after the stop of the control can be prevented. In view of this, the procedure continuing time (t4'−t3' in FIG. 11) in step S25 should be set as such a period of time as to prevent a rapid increase of the charge amount in the capacitor 4 after the stop of the control by the controller 15.

In accordance with the second embodiment of the present invention described above, a power source is supplied from the capacitor to the generator motor being driven by the engine. The engine is driven as a load. Rated constant current control is performed on the generator motor, and rated constant voltage control is performed on the booster, until the capacitor voltage decreases to the first voltage. After the capacitor voltage decreases to the first voltage, rated constant current control is performed on the generator motor, and voltage control is performed on the booster to maintain a predetermined ratio between the booster output voltage to be output to the driver and the capacitor voltage, until the capacitor voltage decreases to the second voltage that is lower than the first voltage. Accordingly, a component for discharging charges from the capacitor is not required, and the discharging of charges from the capacitor can be promptly performed at the time of maintenance.

In accordance with the second embodiment, an AC-coupled bidirectional DC-DC converter is used as the booster. After the capacitor voltage decreases to the first voltage, control is performed so as to minimize the device gross loss of the booster (in the case of the above described booster, control is performed so as to make the booster output voltage twice as high as the capacitor voltage). Accordingly, a temperature increase inside the booster is restricted, and it becomes possible to prevent the voltage from becoming higher than the withstand voltage due to the surge voltage in a power device (IGBT) in the booster possibly caused by a temperature increase. It is also possible to prevent overcurrent breakdown due to current saturation in the inductor. Thus, the inside components can be protected.

In accordance with the second embodiment, a SR motor is used as the generator motor. Accordingly, it is not necessary to perform the control to fix the booster output voltage to counter electromotive force. Thus, the control operation can be simplified.

Other Embodiments

Although the first and second embodiments have been described as the preferred embodiments of the present invention, the present invention is not limited to those specific embodiments. For example, in a case where a SR motor is used as the generator motor, a booster may not be provided in the generator motor driving device. In such a case, the generator motor is driven in a power running mode, and voltage control is performed so as to set the target voltage at zero. By doing so, a generator motor limiting current flows in the discharging direction in the capacitor, and the charges stored in the capacitor gradually flow out and finally become zero.

The booster 14 used in the second embodiment may be used as the booster in the first embodiment. In such a case, the controller 9 performs voltage control in step S3 of FIG. 2, so that the booster output voltage Vcnv becomes equal to 2Vcap.

A generator motor driving device of the present invention is suitable as a power source for a hybrid vehicle, and is particularly suited to be mounted on a construction machine of a hybrid type. For example, in a case where the present invention is applied to a hydraulic shovel, a motor for turning the working vehicle is added to the above described structure, and an inverter for driving the motor is connected in parallel to the capacitor.

It should be noted that the present invention is not limited to the embodiments specifically disclosed above, but other variations and modifications may be made without departing from the scope of the present invention.

INDUSTRIAL APPLICABILITY

As described above, a generator motor driving device and a capacitor discharge method to be implemented in the generator motor driving device of the present invention are useful in a hybrid vehicle having an engine and a generator motor mounted as the drive sources therein, and are particularly suitable for hybrid construction machines.

The invention claimed is:

1. A generator motor driving device comprising:
a generator motor;
an engine that has a drive shaft linked to the generator motor;
a capacitor that stores electric power generated from the generator motor, and supplies power to the generator power;
a driver that is connected to the generator motor and drives the generator motor, and is supplied with the electric power generated from the generator motor;
a booster that is connected in parallel to the capacitor and the driver, and boosts a capacitor voltage of the capacitor and outputs the boosted voltage to the driver; and a controller that supplies power from the capacitor to the generator motor being driven by the engine, drives the generator motor using the engine as a load, performs a rated constant current control on the generator motor and a rated constant voltage control on the booster until the capacitor voltage decreases to a first voltage, and, after the capacitor voltage decreases to the first voltage, performs the rated constant current control on the generator motor and a voltage control on the booster to maintain a predetermined ratio between the capacitor voltage and a booster output voltage to be output to the driver until the capacitor voltage decreases to a second voltage that is lower than the first voltage.

2. The generator motor driving device according to claim 1, wherein the second voltage is the capacitor voltage observed when the booster output voltage is equal to counter electromotive force of the generator motor or is a predetermined voltage in the neighborhood of the counter electromotive force, and when the capacitor voltage decreases to the second voltage, the controller performs control to reduce a current flowing in the generator motor, and performs control to fix the booster output voltage to the counter electromotive force or to a predetermined voltage in the neighborhood of the counter electromotive force.

3. The generator motor driving device according to claim 2, wherein when the capacitor voltage decreases to a third voltage that is lower than the second voltage, the controller continues to perform the control performed at the time of the decrease to the third voltage for a predetermined period of time.

4. The generator motor driving device according to claim 2, wherein when the capacitor voltage decreases to a third voltage that is lower than the second voltage, the controller stops performing the control, and when the capacitor voltage is lower than the second voltage and is higher than a fourth voltage being higher than the third voltage after a predetermined stand-by period of time has passed since the stop of the control, the controller performs control to reduce the current flowing in the generator motor, and performs control to fix the booster output voltage to the counter electromotive force or to a predetermined voltage in the neighborhood of the counter electromotive force.

5. The generator motor driving device according to claim 1, wherein the generator motor is a SR motor, and when the capacitor voltage decreases to the second voltage, the controller continues to perform the control performed at a time of the decrease to the second voltage for a predetermined period of time.

6. The generator motor driving device according to claim 1, wherein the booster is an AC-coupled bidirectional DC-DC converter which includes two voltage source inverters having direct-current terminals connected in series to be additive polarity and a transformer AC-coupling alternating-current terminals of the two voltage source inverters to each other and having a predetermined leakage inductance, in which one of the two voltage source inverters is connected in parallel to the capacitor, and which outputs a direct-current voltage obtained by boosting the capacitor voltage of the capacitor to the driver.

7. The generator motor driving device according to claim 6, wherein, after the capacitor voltage decreases to the first voltage, the controller performs voltage control on the booster to make the booster output voltage twice as high as the capacitor voltage until the capacitor voltage decreases to the second voltage.

8. A method for discharging charges of a capacitor in a generator motor driving device that includes a generator motor, an engine that has a drive shaft linked to the generator motor, a capacitor that stores electric power generated from the generator motor and supplies power to the generator power, a driver that is connected to the generator motor and drives the generator motor and is supplied with the electric power generated from the generator motor, and a booster that is connected in parallel to the driver and boosts a capacitor voltage of the capacitor and outputs the boosted voltage to the driver, the method comprising:

supplying power from the capacitor to the generator motor being driven by the engine, and driving the generator motor using the engine as a load;

performing a rated constant current control on the generator motor and a rated constant voltage control on the booster until the capacitor voltage decreases to a first voltage;

performing the rated constant current control on the generator motor and the rated constant voltage control on the booster until the capacitor voltage decreases to a first voltage; and after the capacitor voltage decreases to the first voltage, performing the rated constant current control on the generator motor and a voltage control on the booster to maintain a predetermined ratio between the capacitor voltage and a booster output voltage to be output to the driver, until the capacitor voltage decreases to a second voltage that is lower than the first voltage.

* * * * *